Dec. 12, 1967  R. F. ARNOLDY  3,358,115
OPEN ARC OR GAS SHIELDED GRANULAR WELDING
Filed Nov. 28, 1966
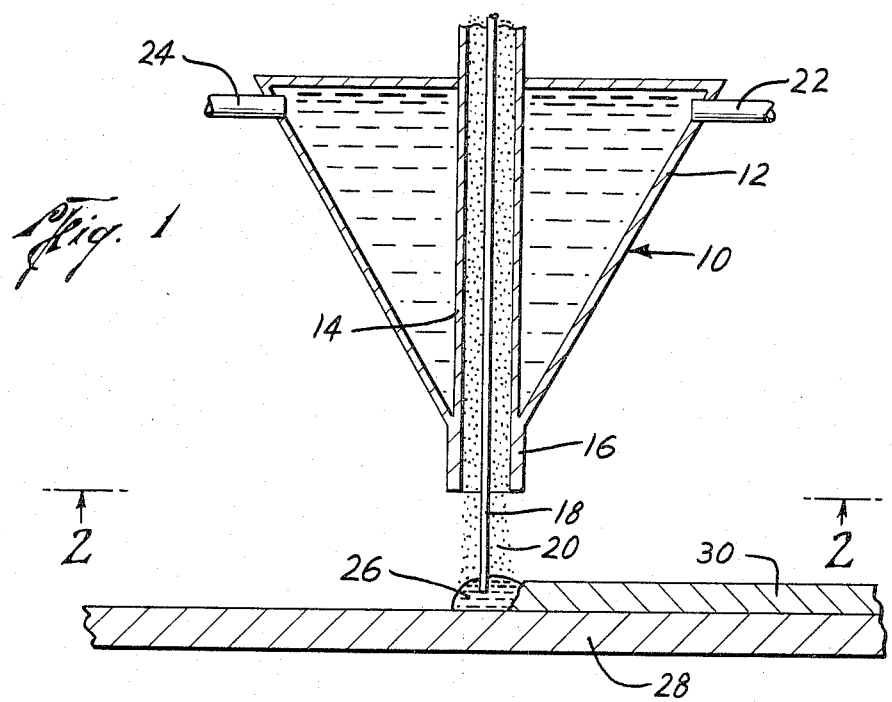
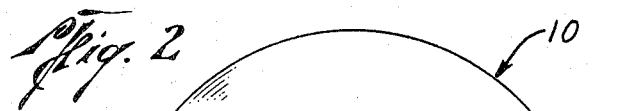
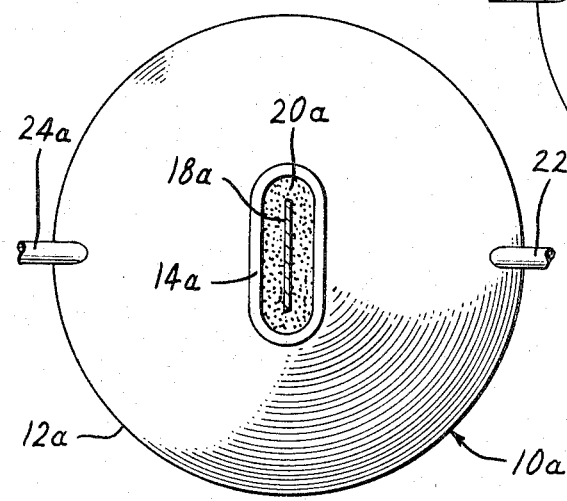
Roman F. Arnoldy
INVENTOR.
BY James F Weiler
Paul L DeVerter II
Dudley R Dobie Jr
Henry W Hope
ATTORNEYS

United States Patent Office 3,358,115
Patented Dec. 12, 1967

3,358,115
OPEN ARC OR GAS SHIELDED GRANULAR WELDING
Roman F. Arnoldy, P.O. Box 19527,
Houston, Tex. 77024
Filed Nov. 28, 1966, Ser. No. 597,251
9 Claims. (Cl. 219—76)

ABSTRACT OF THE DISCLOSURE

Open arc or gas shielded welding method with granular metal and consumable electrodes. High quality welds are obtained and base penetrations controlled by depositing predetermined amounts of granular material directly into the puddle to cool the puddle to an average temperature within the range of about 100° F. to about 500° F. above the highest melting point of the weld material desired to be melted. About 1.3 to 3.5 parts granular material to one part electrode, by weight, are used to control the temperature of the puddle and base penetration. The method avoids the use of flux for most materials.

---

The present invention relates to an improved method of welding, cladding and the like using a consumable electrode and granular metallic materials, and more specifically, relates to such a method in which high quality welds are obtained and base penetration is controlled.

In the production of welds and cladding, the use of a granular welding material has become more prevalent because of the marked improvements in methods and mechanisms. Particular advantages in using granular welding materials lie in the relatively low cost and high speed, when compared to other cladding methods. Such methods are generally disclosed in my Patents Nos. 3,076,888, 3,060,307, and 3,172,991.

It is often desirable to produce a weld or to clad a surface using a metered consumable electrode and granular material in an automatic open arc, with or without gas shielding, but in the past this has produced serious problems. The high temperature of the arc produces high temperatures in the puddle in the vicinity of the arc which produces welds of relatively low quality. The low quality is due to grain growth which decreases ductility and strength and is a principal reason why castings generally are not as good as rolled steel since the latter have a finer grain structure.

Grain growth in welds and cladding is a function of both temperature and time. There is rapid grain growth at high temperatures even for a relatively short time and a slower grain growth at lower temperatures, however, if the lower temperature is maintained for a period of time there is sufficient grain growth to be deleterious to the weld which produces welds of relatively low quality. It would be highly advantageous to provide a welding method in which the temperature of the puddle is maintained at a relatively low temperature, that is one within 500° F. of the melting temperature of the weld materials being used and in which even the relatively low temperature is maintained for relatively short periods of time. This produces welds of very high quality, that is, ones with very little deleterious grain growth. The present invention is directed to such a method.

It would also be desirable to provide an open arc welding method, with or without gas shielding, in which high quality welds and cladding are produced and in which the granular welding material is deposited directly into the puddle, in predetermined amounts to cool the temperature of the puddle and to control base penetration, and in which granulars and powders of low density are not blown away by the arc force thereby making a weld of predetermined analysis. The present invention is also directed to such a method.

Thus, the present invention allows welding of high quality without flux for most materials, with open or gas shielded arc without the foregoing difficulties, makes possible visual observation of the welding operation. It does away with the use and expense of flux for many materials for which it was formerly required.

It is therefore an object of the present invention to provide an improved method of open arc welding, with or without gas shielding, by which high quality welds and cladding are obtained.

It is yet a further object of the present invention to provide a method of open arc welding, with or without gas shielding in which high quality welds are produced and in which the amount of penetration of the base is controlled.

Yet a further object of the present invention is the provision of a method of open arc welding and cladding with or without gas shielding, in which the average puddle temperature is controlled within a range of about 100° F. to about 500° F. above the melting point of the highest melting point of the weld materials and in which temperature of the puddle cools rapidly thereby providing welds and cladding of extremely high quality.

Yet a further object of the present invention is the provision of a welding and cladding method in which the temperature of the puddle and the amount of the penetration of the base metal are controlled by adding between about 1.3 to about 3.5 parts granular weld material, by weight, to each part consumable electrode.

Yet a further object of the present invention is the provision of a method of welding and cladding which eliminates the use of flux for most materials but permits the use of weld materials of low density which would otherwise be blown away by the arc force.

Other and further objects, features and advantages of the present invention will be apparent from the following description of presently-preferred embodiments thereof, taken in conjunction with the accompanying drawings, in which like numerals designate like parts throughout the several views, and where, FIGURE 1 illustrates a side view of an open arc nozzle useful in the method of the invention, FIGURE 2 is a bottom view of the open arc nozzle of FIGURE 1, and FIGURE 3 is a bottom view of a modified form of open arc nozzle.

Referring now to the drawings, and particularly to FIGURE 1, an open arc nozzle, generally indicated by the reference numeral 10, is illustrated which has a generally cone-shaped body 12, provided with a generally tubular body member 14 therethrough to the discharge nozzle 16 for passage of the consumable electrode 18, here illustrated as a wire electrode, and granular or powder weld materials 20. The consumable wire type electrode 18 and the granular or powdered weld material 20 are from a metering wire feeder and a metering granular or powder feeder of any desired type, such as illustrated in my Patents 3,060,307 and 3,172,991.

The outer body member 12 and the generally central tube like member 14 provide, in effect, a cooling jacket into which water or other coolant is circulated by means of the inlet 22 and the outlet 24. Since any desired feeder for the electrode and for the granular powder material which provides metered amounts of these materials may be used, no detailed description thereof is deemed necessary or given.

In using the nozzle of FIGURES 1 and 2 a metered amount of a consumable electrode wire 18 is fed and metered amounts of granular weld material 20 are fed by gravity through the nozzle 10. The energy of the arc has formed a puddle 26 on the work 28 and the granular weld material 20 is deposited directly into the puddle 26 in amounts sufficient to maintain the temperature of the puddle 26 not over about 500° F. above the melting point of these weld materials. The open arc nozzle 10 is moved along the work or reciprocated and moved along the work so that the arc rapidly passes from the melted puddle 26 to form a new puddle into which additional weld material 20 is deposited thereby cooling the puddle and permitting it to cool rapidly from its highest temperature so that the puddle 26 is not maintained at the highest temperature for any extended period of time.

The temperature of the puddle may be maintained within the range of about 100° F. to about 500° F. above the melting point of the weld material by maintaining between 1.3 to 3.5 parts of granular weld material to one part electrode on a weight basis in the puddle 26 and by using normal amperage for the arc. The more granular material 18 deposited in the puddle 26, the lower the temperature of the puddle 26 and the less penetration of the base 28. The less granular material 20 deposited in the puddle 26, the less cooling effect on the puddle and, accordingly, the puddle temperature is higher which causes more melting of the base metal 28 and hence, more penetration. The upper temperature range of 500° F. above the highest melting point of the weld materials, however, and by moving the nozzle 10 along the path to be welded or clad, or oscillated and so moved, permits rapid cooling of the puddle and hence, provides high quality welds.

The method is applicable to consumable strip electrodes, as well as wire type electrodes. A suitable nozzle for strip electrodes is illustrated in FIGURE 3, to which reference is now made, and in which the reference letter a has been added to numerals designating to corresponding parts in FIGURES 1 and 2. In general, the nozzle 10a of FIGURE 3 is the same as that of FIGURES 1 and 2 except that the nozzle tube 14a is generally elongated in cross section, rather than round, to receive the strip-like electrode 18a and a similar space is provided for the granular or powder weld material 20a to be fed about the strip-like electrode 18a.

The other parts of the nozzle are the same and any desired metering feeder for the wire electrode and metering feeder for the granular or powder weld materials may be utilized as in the case of the nozzle 10 of FIGURES 1 and 2. Accordingly, no more detailed description of this particular nozzle is deemed necessary or given.

The nozzle of 10a, however, is used in the same manner as that of FIGURE 1 except that a wider strip of weld is deposited than for that illustrated in FIGURES 1 and 2. Thus, an arc is formed between the lower portion of the consumable electrode 18a and the work 26a to form a puddle and the granular or powder weld material 20a is deposited in the puddle 26 within the amounts indicated to maintain the temperature of the puddle in the range specified.

It is appreciated that the temperature of the puddle at various points in the puddle 26 will vary considerably. The temperature of the puddle at the arc will be high, and the temperature of the puddle as it extends out from the arc will be less and less. Also, the deposition of the powder material 20 into the puddle 26 rapidly cools the temperature of the puddle adjacent the arc. Accordingly, by reference to the puddle temperature is meant the mean temperature of the puddle in the area adjacent the arc.

The powder materials may be fed by gravity into the puddle. If nonmagnetic granulars are used, they should have a free fall of at least one inch for powders of high density, that is over about 2.4 gr./cm.$^3$ and a free fall up to about eight inches or more for powders of low density, that is below about 2.4 gr./cm$^3$. Free falls above eight inches may be used depending upon the size of the particle and weight. Also, if desired, equivalent velocity may be obtained by gas propellants or other means, for example, if the weld material is too light and fine to free fall to the puddle.

For commercial operation, the space between the electrode and the nozzle should be between about 1/32 inch and 1/4 inch for electrodes no larger than about 1/4 inch thick in their thinnest section.

In the event flux is used, the nozzle should have means for depositing the flux on the puddle over and about the means for depositing the granular weld material.

The following examples illustrate the method in using typical weld materials. In the examples and in the claims, all ratios are on a weight basis.

*Example I*

In this example, stainless steel was applied to a metal base. In conventional cladding methods, the arc temperature and hence the puddle temperature in the areas adjacent the arc, is about 5000° F. Stainless steel has a melting temperature of approximately 2550° F. The temperature of the puddle in areas adjacent the arc was reduced to about 2800° F. by the addition of about 1.3 parts of stainless steel powder to each part of electrode. Good but minimum penetration was obtained, of the order of about 20% and the resulting stainless steel weld was of high quality, that is, had a relatively fine structure and good ductility and strength.

The temperature of the puddle was decreased to approximately 2650° F. by the addition of 3.5 parts powdered stainless steel to the electrode, which produced a weld of high quality with less penetration of the base, of the order of about 10%.

*Example II*

In this example, mild steel was substituted for stainless steel in Example I with the same results.

*Example III*

In this example Monel was used which generally melts at a temperature of the order of about 2400° F. In conventional welding methods, the temperature of the puddle adjacent the arc is about 4500° F. In this example, approximately 1.8 parts powdered Monel to electrode was added which reduced the temperature of the puddle in the area adjacent the arc to about 2650° F. This resulted in a high quality weld with a maximum penetration of about 10% and dilution of the Monel weld by the base metal. The temperature of the puddle was increased to about 2900° F. by reducing the Monel to 1.3 parts to one part electrode. A high quality weld was produced with more penetration, of the order of about 20%.

*Example IV*

In this example cast iron was used which has a melting point of approximately 2000° F. In conventional welding methods in working with cast iron a puddle temperature of about 4500° F. is utilized. In this example, the puddle temperature was reduced to approximately 2250° F. by the addition of 2 parts powder to each part of electrode. A good quality weld was produced with a penetration of about 15%. The amount of the powder was increased to 3.5 parts to one of the electrode and the temperature of the puddle was about 2100° F. A good quality weld was produced with a maximum penetration of about 5% but yet a good bond was provided. The amount of the powder was reduced to 1.3 parts to one part electrode which reduced the puddle temperature to about 2500° F. which produced a weld of high quality with maximum penetration, about 20%.

*Example V*

In this example a high speed steel cladding was produced using elemental steel wire and alloy granulars. The puddle temperature was maintained at below 3000° F. by the addition of 2 parts powdered steel to each part of electrode. The cladding produced was a steel which was hardened as it was put down and required no heat treatment. In tests it outlasted by about three times high speed steel made in the conventional manner. These steels were M-2 analysis as follows:

| | |
|---|---|
| Carbon | .85 |
| Chrome | 4.00 |
| Vanadium | 2.00 |
| Tungsten | 6.25 |
| Molybdenum | 5.00 |
| Iron | Balance |

In the following examples no specific weld materials are set forth, but general ranges of temperature and powdered material added are set forth.

*Example VI*

Various carbon steels melt at temperatures of the order of about 2550° F. to about 2570° F. For nominal penetration, weld material is added so that the average puddle temperature is approximately 2800° F. By adding more and less powder material to electrode, the temperature of the puddle will vary from about 2650° F. to 3150° F. and produce a weld of very high quality with the desired penetration of the base metal.

*Example VII*

The melting point of various hard facing materials, such as high chrome or high carbon hard facing materials is of the order of about 2300° F. For these materials enough granular weld material or powder may be added to provide a puddle temperature of from about 2400° F. to about 2800° F. Preferably, a puddle temperature of about 2600° F. is utilized which would provide good but minimum penetration.

*Example VIII*

In general the various ferrous materials melt at a temperature of 2500° F. and slightly above. By applying sufficient weld powder so that the puddle temperature is between about 2600° F. and 3000° F. produces welds of high quality with the desired penetration of the base metal.

*Example IX*

In this example a vessel used in the oil industry was hard faced by cladding using mild steel wire and alloy granulars. A puddle temperature of about 2600° F. was produced as opposed to the conventional puddle temperature of about 4500° F. The abrasion factor of this cladding was 20.2 to one to about 15 to one of the same material by the open arc. This material had the following composition:

| | |
|---|---|
| Chromium | 30.30 |
| Carbon | 4.77 |
| Manganese | 4.00 |
| Molybdenum | 1.03 |
| Iron | Balance |

No more examples are given as many of the various weld materials, hard facing, cladding materials and the like may be utilized and it would require simple routine experimentation to arrive at optimum temperatures for these materials for the desired base penetration within the temperature range set forth by adding weld granular or powdered weld material within the range of about 1.3 parts to about 3.5 parts granular weld material to electrode.

A principal reason for high quality welds and cladding by the method of the present invention is at high temperatures there is oxidation of carbon, iron and other ingredients in the puddle at the surface. In the present method there is less oxidation of these materials because of the lower puddle temperature and the lower period of time that the puddle remains at its highest temperature. It takes less time for a puddle at a lower temperature to cool than one at a higher temperature. Thus, the lower temperature and shorter time prevents the coalescing of carbides into over large and widely spaced carbides and prevents large grain structure in the matrix. The grain growth and large grain structure is, as is well known, deleterious and decrease the ductility and strength of the weld.

In studying welds or cladding by the present method and by conventional open arc methods by micrographs, it is readily apparent that the grain structure of the welds or cladding of the present method are finer than in conventional methods. Also, better results are obtained in testing welds of the present method than conventional open arc methods, in tensile, bend, and charpy tests.

The present method eliminates the need for the use of separately fed granular flux materials, which would of course add an expense to the welding method if used, and provides good visibility as the welding or cladding takes place. If desired, however, flux materials may be utilized with the method by feeding them with the metal.

The present invention, therefore, is well suited and adapted to attain the ends and objects and has the advantages and features mentioned as well as others inherent therein.

While presently-preferred embodiments of the invention have been given for the purpose of disclosure, changes may be made which are within the spirit of the invention as defined by the scope of the appended claims.

What is claimed is:

1. A method of welding or cladding a surface comprising,
    forming an arc between a consumable electrode and the surface thereby forming a puddle,
    cooling the puddle by depositing granular weld material directly into the puddle and substantially independent of the electrode in a ratio of about 1.3 to about 3.5 parts of the granular weld material to each part of the electrode and maintaining the temperature of the puddle in the range of about 100° F. to about 500° F. above the melting point of the highest melting point of the granular weld material and the electrode.

2. The method of claim 1 where
    the granular weld material is deposited into the puddle by gravity.

3. The method of claim 2 where
    the granular weld material has a free fall of at least about one inch.

4. The method of claim 1 where
    the electrode is in the form of a wire.

5. The method of claim 1 where
    the electrode is in the form of a strip.

6. The method of claim 1 where
    the welding or cladding is by open arc.

7. The method of claim 1 where
    the welding or cladding is by gas shielded arc.

8. A method of welding or cladding a surface comprising,
    forming an arc between a consumable electrode and the surface thereby forming a puddle,
    depositing granular weld material directly into the puddle and substantially independent of the electrode to thereby cool the puddle, and
    maintaining the temperature of the puddle in the range of about 100° to about 500° above the melting point of the highest melting point of the granular weld material in the electrode.

9. A method of welding or cladding a surface comprising, forming an arc between a consumable electrode and the surface thereby forming a puddle, depositing granular weld material directly into the puddle and substantially independent of the electrode in a ratio of about 1.3 to about 3.5 parts of the granular weld material to each part of the electrode thereby cooling the puddle.

References Cited

UNITED STATES PATENTS

| 2,175,607 | 10/1939 | Kinkead | 219—76 |
| 2,709,213 | 5/1955 | Gibson | 219—76 |
| 2,848,593 | 8/1958 | Newman et al. | 219—73 |
| 2,927,990 | 3/1960 | Johnson | 219—73 |
| 2,948,803 | 8/1960 | Wilson et al. | 219—74 |
| 3,016,447 | 1/1962 | Gage et al. | 219—76 |
| 3,271,553 | 9/1966 | Johnson | 219—76 |

RICHARD M. WOOD, *Primary Examiner.*